United States Patent
Fowler et al.

(10) Patent No.: US 11,339,809 B2
(45) Date of Patent: May 24, 2022

(54) LINEAR ACTUATOR WITH ROTARY POSITIONAL OUTPUT

(71) Applicant: Jindex Pty Limited, Frenchs Forest (AU)

(72) Inventors: Stephen Francis Fowler, Avalon Beach (AU); Mitchell Gordon, Glebe (AU); David John Buchanon Taylor, Sandy Bay (AU)

(73) Assignee: JINDEX PTY LIMITED, Frenchs Forest (AU)

( * ) Notice: Subject to any disclaimer, the term of this patent is extended or adjusted under 35 U.S.C. 154(b) by 222 days.

(21) Appl. No.: 15/758,820

(22) PCT Filed: Sep. 9, 2016

(86) PCT No.: PCT/AU2016/050847
§ 371 (c)(1),
(2) Date: Mar. 9, 2018

(87) PCT Pub. No.: WO2017/041140
PCT Pub. Date: Mar. 16, 2017

(65) Prior Publication Data
US 2019/0383313 A1 Dec. 19, 2019

(30) Foreign Application Priority Data
Sep. 9, 2015 (AU) ................. 2015903670

(51) Int. Cl.
*F15B 15/28* (2006.01)
*F16K 31/122* (2006.01)
*F16K 37/00* (2006.01)

(52) U.S. Cl.
CPC ........ *F15B 15/2823* (2013.01); *F15B 15/283* (2013.01); *F16K 31/122* (2013.01); *F16K 37/0008* (2013.01)

(58) Field of Classification Search
CPC .. F15B 15/2823; F15B 15/283; F16K 31/122; F16K 37/0008
(Continued)

(56) References Cited

U.S. PATENT DOCUMENTS 727,503 A * 5/1903 Walker ................. F22D 5/22
417/39
3,046,802 A 7/1962 Cupedo
(Continued)

FOREIGN PATENT DOCUMENTS

CN       103498834 A     1/2014
DE   10 2005 048263 B4  4/2007
(Continued)

OTHER PUBLICATIONS

International Search Report in PCT International Patent Application No. PCT/AU2016/050847 dated Nov. 1, 2016.

*Primary Examiner* — Angelisa L. Hicks
(74) *Attorney, Agent, or Firm* — Greenberg Traurig, LLP; Chinh H. Pham; Joshua I. Rudawitz (57) ABSTRACT

This invention provides a linear actuator with a cylinder defining a cylinder axis. A piston is movable within the cylinder along the cylinder axis, and a piston rod extends axially from the piston for connection to a mechanism whereby in use, movement of the piston actuates the mechanism. A rotary output mechanism includes a rotary output element extending generally transversely from the cylinder and supported for rotation about an output axis generally normal to the cylinder axis. The rotary output mechanism is responsive to movement of the piston, and the rotary output element is adapted for operative engagement with an instrument mounted to the cylinder such that axial movement of the piston effects a corresponding rotational displacement of the rotary output element, whereby in use the instrument (Continued)

provides an output signal indicative of the position of the piston within the cylinder.

6 Claims, 7 Drawing Sheets

(58) Field of Classification Search
USPC ................................................ 137/551–559
See application file for complete search history.

(56) References Cited

U.S. PATENT DOCUMENTS

| | | | |
|---|---|---|---|
| 4,121,504 A | 10/1978 | Nowak | |
| 4,854,218 A | 8/1989 | Stoll | |
| 6,253,460 B1* | 7/2001 | Schmitz | G01D 5/145 |
| | | | 324/207.22 |
| 7,097,148 B2* | 8/2006 | DeWall | F16K 31/53 |
| | | | 251/129.12 |
| 7,290,476 B1 | 11/2007 | Glasson | |
| 2013/0230389 A1* | 9/2013 | Giannotta | F15B 15/2838 |
| | | | 415/173.2 |

FOREIGN PATENT DOCUMENTS

| | | |
|---|---|---|
| GB | 1 177 960 A | 1/1970 |
| GB | 2154282 A | 9/1985 |
| JP | S12513 Y1 | 8/1941 |
| JP | S50067875 U | 6/1975 |
| JP | S52-36395 Y | 8/1977 |
| JP | S53-087390 U | 7/1978 |
| JP | S52-148896 U | 10/1981 |
| JP | S57-57195 A | 4/1982 |
| JP | S59-040603 U | 3/1984 |
| JP | S6357902 A | 3/1988 |

\* cited by examiner

LINEAR ACTUATOR WITH ROTARY POSITIONAL OUTPUT

CROSS-REFERENCE TO RELATED APPLICATIONS

This application is a U.S. national phase application of PCT International Patent Application No. PCT/AU2016/050847, filed on Sep. 9, 2016, which claims the benefit of and priority to Australian application no. 2015903670, filed Sep. 9, 2015, each of which are hereby incorporated by reference in their entireties.

FIELD OF THE INVENTION

The present invention relates generally to actuators and more particularly to linear actuators. The invention has been developed primarily to facilitate the actuation of valves, in order to regulate fluid flow through associated pipelines, conduits, channels or ducts in a wide variety of industrial processes and will be described predominantly in this context. However, it should be understood that the invention is not limited to this particular application. It should also be understood that although predominantly described in connection with hydraulic and pneumatic actuators, the invention is potentially applicable to any form of linear actuator including mechanical and electromechanical actuators.

BACKGROUND OF THE INVENTION

The following discussion of the prior art is intended to place the invention in an appropriate technical context and enable its advantages to be more fully appreciated. However, any references to prior art throughout this specification should not be taken as an express or implied admission that such art is well known or is common general knowledge in the relevant field.

A wide variety of valves are known for regulating fluid flow in pipelines, in a broad range of industries including the chemical, petrochemical, mining, minerals processing, food processing and packaging, water distribution, sewage treatment, and other industries. Examples of valves used for various purposes in such environments include butterfly valves, gate valves, knife valves, ball valves, poppet valves, plug valves, dart valves, pinch valves, diaphragm valves, and the like. The vast majority of valves used for flow control in industrial and commercial scale operations are rotary type valves such as butterfly valves and ball valves, wherein the desired flow control is effected by rotational movement of a flow control element between open and closed positions within the valve body.

In order to achieve accurate control of these valves in the context of automated or semi-automated process control systems, it is typically necessary or highly desirable to generate an output signal that is accurately indicative of the actual position of the flow control element within the valve. At the very least, it is often desirable to provide a visual indication of the valve position, to enable prompt and reliable verification by visual inspection.

For these purposes, a wide range of instruments have been developed, including limit switches adapted to generate control signals when the valve is fully open or closed, positioners adapted accurately to position the valve in response to process control signals, and local indicators adapted to provide a direct visual indication of valve position. However, because most industrial control valves are rotary by design, the vast majority of instruments and sensors readily available for position indication and control are similarly rotary by design, in the sense of being adapted directly to receive rotary inputs indicative of valve position.

For example, butterfly and ball valves in the present context typically include an output spindle protruding from the valve body and connected either directly or indirectly to the flow control element within the body, such that rotation of the flow control element between the open and closed positions produces a corresponding rotation of the output spindle. The required limit switch, positioner, indicator or sensing instrument is then mounted to the valve body for direct engagement with the output spindle, and calibrated to respond as required in accordance with the position of the flow control element within the valve. In most cases, movement between the fully open and fully closed positions corresponds to a rotational movement of the rotary flow control element through 90°. This produces a corresponding rotational movement of the output spindle within the same 90° range, and the associated positioner or sensor is calibrated accordingly.

While most industrial scale valves are of the rotary type, a number of valves such as gate valves, knife valves, slide valves, pinch valves, plug valves, dart valves and the like are of the linear type, in the sense that flow regulation is based on linear or translational displacement of a flow control element between the open and closed positions. Valves of this type are most efficiently and effectively controlled by means of linear actuators. In such cases, however, because the operational movements of both the valves and the corresponding actuators are inherently linear, most readily available sensors, positioners and indicators such as the Namur type instruments previously described cannot be used directly, as they are dependent upon rotary inputs. This renders the associated process control, whether automated, semi-automated or manual, less accurate, less reliable and/or more complex and expensive.

In an attempt to ameliorate this problem, it has been proposed to provide a linear to rotary conversion mechanism within a linear actuator. However, known mechanisms of this type inherently provide the external rotary output component on top of the cylinder. In many installations, particularly larger scale installations involving large capacity actuators located behind guard rails, safety screens or the like, this orientation renders access to and visual inspection of any instrument or indicator of conventional type difficult and potentially dangerous, depending upon surrounding spatial constraints and access conditions.

It is an object of the present invention to overcome or ameliorate one or more disadvantages of the prior art, or at least to provide a useful alternative.

SUMMARY OF THE INVENTION

Accordingly, in a first aspect, the invention provides a linear actuator including:
a cylinder defining a cylinder axis;
a piston movable within the cylinder along the cylinder axis;
a piston rod extending axially from the piston for connection to a mechanism whereby in use, movement of the piston actuates the mechanism;
a rotary output mechanism including a rotary output element extending generally transversely from the cylinder and supported for rotation about an output axis generally normal to the cylinder axis;

the rotary output mechanism being responsive to movement of the piston, and the rotary output element being adapted for operative engagement with an instrument mounted to the cylinder;

such that axial movement of the piston effects a corresponding rotational displacement of the rotary output element, whereby in use the instrument provides an output signal indicative of the position of the piston within the cylinder.

Preferably, the linear actuator is an hydraulic or pneumatic actuator. Preferably, the instrument is a positioner or position indicator. In one embodiment, the mechanism to which the actuator is connected is a valve mechanism, and preferably a linear type valve such as a gate, knife, dart, plug or pinch valve.

Preferably, the rotary output element includes a rotary drive spindle, adapted for operative engagement with a complementary rotary input element of the instrument.

In one embodiment, the instrument is adapted for mounting on a side wall of the cylinder by means of an intermediate mounting bracket assembly. In some embodiments, the instrument is a Namur type instrument.

The output signal in some embodiments is based on a sight gauge adapted to display a visual indication of the position of the piston within the cylinder. The output signal in some embodiments is an electrical control signal, preferably a Namur compatible control signal. In some embodiments, the instrument provides both a visual output display and an electrical output control signal.

Preferably, the operational range of rotational displacement of the rotary output element is calibrated to match the operational range of rotational displacement of the rotary input element of the instrument. This may be achieved, for example, by means of the inherent design of the rotary output mechanism, a supplementary gearbox, or an intermediate motion conversion mechanism. In some preferred embodiments, the operational range is around 90°, for direct compatibility with conventional Namur type instruments. In other embodiments, the operational range is around 55°, for compatibility with other standard forms of instrumentation.

In embodiments where the actuator is connected to a valve mechanism, the rotary output mechanism is preferably calibrated such that the operational range of rotational displacement of the rotary output element and the operational range of rotational displacement of the associated rotary input element of the instrument, correspond to the full operational range of movement of the flow control element within the valve, between the fully open and fully closed positions. In this way, the instrument preferably provides an output signal (visual and/or electrical) that is directly indicative of the operational position of the valve itself.

In some embodiments, the rotary output mechanism is manufactured integrally with the actuator, while in other embodiments the rotary output mechanism is adapted for retrofitting to conventional actuators.

In one embodiment, the rotary output mechanism includes a scissor or pantograph type linkage mechanism, comprising a plurality of elongate linkage elements pivotably interconnected in a criss-cross or "X" configuration within the cylinder, with a pivot axis at each end. Preferably, a movable end of the linkage mechanism is connected to a crown of the piston and the opposite fixed end of the linkage mechanism is supported adjacent the cylinder head, within the cylinder. One of the linkage elements at the fixed end is preferably operatively connected to the rotary output element with the pivot axis of the linkage mechanism at the fixed end being coaxial with the rotary output element, whereby axial displacement of the piston effects a corresponding rotational displacement of the rotary output element.

In one embodiment, the rotary output mechanism includes a relatively stiff toothed drive belt engageable with a complementary toothed pinion gear housed within the cylinder. The drive belt is preferably connected at one end to the piston crown and the pinion gear is preferably supported adjacent the cylinder head, within the cylinder. The pinion wheel is preferably connected co-axially with the rotary output element, and guide means preferably retain the drive belt in operative engagement with the pinion, such that axial displacement of the piston effects a corresponding displacement of the drive belt, which in turn causes rotation of the pinion to effect a corresponding rotational displacement of the rotary output element. In one embodiment, the guide means take the form of an adjacent inner surface of the cylinder head. Preferably, the drive belt is sufficiently stiff to transmit drive to the pinion substantially in proportion to piston displacement, while being sufficiently flexible for the free end to be contained within the cylinder throughout the normal range of operational movement.

In one embodiment, the rotary output mechanism includes tooth formations or a toothed rack on the piston rod below the piston crown, engageable with a complementary toothed pinion gear housed within the cylinder. Preferably, the pinion gear is connected to the rotary output element whereby axial displacement of the piston effects a corresponding rotational displacement of the rotary output element.

In one embodiment, the rotary output mechanism includes a pressure tube extending slidably through the piston crown into a pressure chamber within the piston rod, and a conversion mechanism adapted to induce rotary motion of the rotary output element in response to changes in pressure within the pressure tube, such that axial displacement of the piston induces a corresponding change in pressure within the pressure tube to effect a corresponding rotational displacement of the rotary output element. In one embodiment, the conversion mechanism includes a Bourdon tube.

In one embodiment, the rotary output mechanism includes a frusto-conical formation on the piston rod defining a ramp surface inclined with respect to the cylinder axis, and a ramp engagement formation oriented generally normally to the cylinder axis and adapted for rolling or sliding engagement with the ramped surface, such that axial displacement of the piston induces a corresponding lateral or radial displacement of the engagement formation. In this embodiment, the rotary output mechanism preferably includes a conversion mechanism whereby the lateral displacement of the engagement formation is translated into a corresponding rotational movement of the rotary output element, such that axial displacement of the piston effects a corresponding rotational displacement of the rotary output element. In one preferred form, the conversion mechanism includes a gear train or gear box.

In one embodiment, the rotary output mechanism includes a spring-loaded drive spool supported within the cylinder for rotation about a transverse axis, and a flexible cable extending from the piston crown to the drive spool. The drive spool is preferably coupled to a drive axle, which in turn is preferably connected to the rotary output element, such that axial displacement of the piston causes rotational displacement of the drive spool and axle, to effect a corresponding rotational displacement of the rotary output element.

In some embodiments, the rotary output mechanism may require the piston or piston rod to be constrained for movement with only 1 degree of freedom (i.e. axial displacement)

and specifically to prevent relative rotational displacement within the cylinder. In such cases, in some forms of the invention, an anti-rotation mechanism is incorporated. This mechanism may be internal or external to the cylinder, or inherent in the design of the piston and cylinder. In other forms, the rotary output mechanism is attached or configured so to operate independently of any rotational displacement of the piston or piston rod within the cylinder.

In some embodiments, the piston and cylinder have corresponding non-circular cross-sectional profiles, thereby to permit relative axial displacement while preventing relative rotation between the piston and the cylinder.

In one preferred embodiment, the piston and cylinder have corresponding square or rectangular cross-sectional profiles. In another embodiment, the piston and cylinder have corresponding oval-shaped or elliptical cross-sectional profiles. In other embodiments, the cross-sectional profile is triangular, pentagonal, hexagonal, octagonal or otherwise polygonal in shape. In one embodiment, the piston and cylinder have corresponding predominantly circular cross-sectional profiles, but additionally incorporate complementary axially extending key and key way formations to prevent relative rotation.

Preferably, a seal of corresponding shape is captively retained within an outer peripheral side wall or side skirt the piston, for slidable sealing engagement with an inner wall of the cylinder.

The invention in a further aspect, provides a rotary output mechanism as previously defined, adapted for connection to a linear actuator, such that axial movement of the piston within the cylinder of the actuator effects a corresponding rotational displacement of the rotary output element of the output mechanism, whereby in use a rotary instrument mounted to the cylinder or to the rotary output mechanism provides an output signal indicative of the position of the piston within the cylinder.

In another aspect, the invention provides a method for indicating the position of a piston within a cylinder of a linear actuator, the linear actuator including:

a cylinder defining a cylinder axis;

a piston movable within the cylinder along the cylinder axis;

a piston rod extending axially from the piston for connection to a mechanism whereby in use, movement of the piston actuates the mechanism;

the method including the steps of:

providing a rotary output mechanism including a rotary output element extending generally transversely from the cylinder and supported for rotation about an output axis generally normal to the cylinder axis, such that the rotary output mechanism is responsive to movement of the piston; and connecting the rotary output element for operative engagement with an instrument mounted to the cylinder, whereby axial movement of the piston effects a corresponding rotational displacement of the rotary output element;

such that the instrument provides an output signal indicative of the position of the piston within the cylinder.

BRIEF DESCRIPTION OF THE DRAWINGS

Preferred embodiments of the invention will now be described, by way of example only, with reference to the accompanying drawings in which.

PREFERRED EMBODIMENTS OF THE INVENTION

Figure 1:
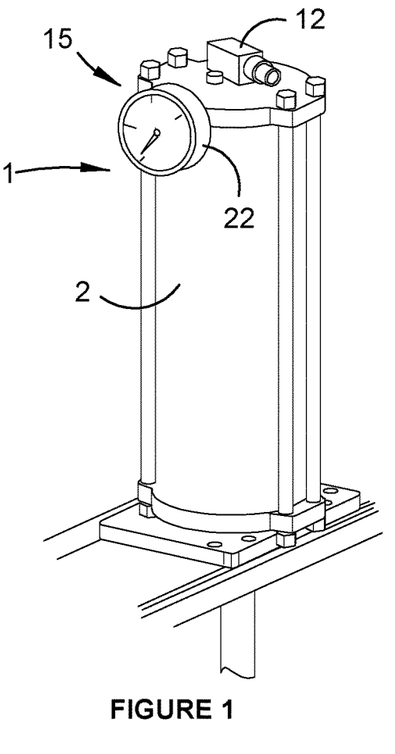
FIG. 1 is a perspective view of an actuator according to the invention.
Figure 2:
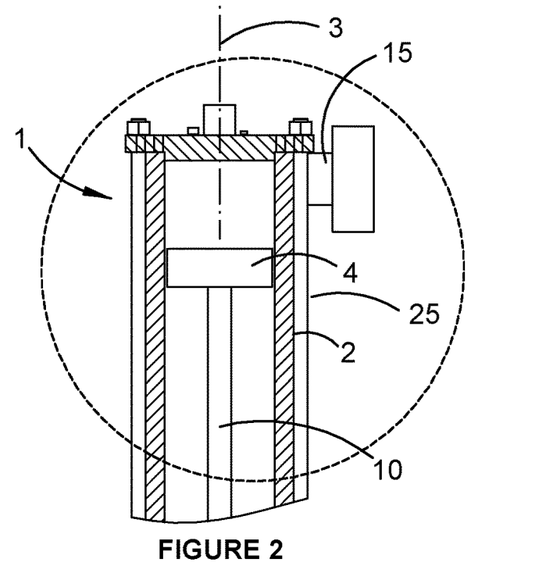
FIG. 2 is a cutaway side elevation view of the actuator shown in FIG. 1.
Figure 3:
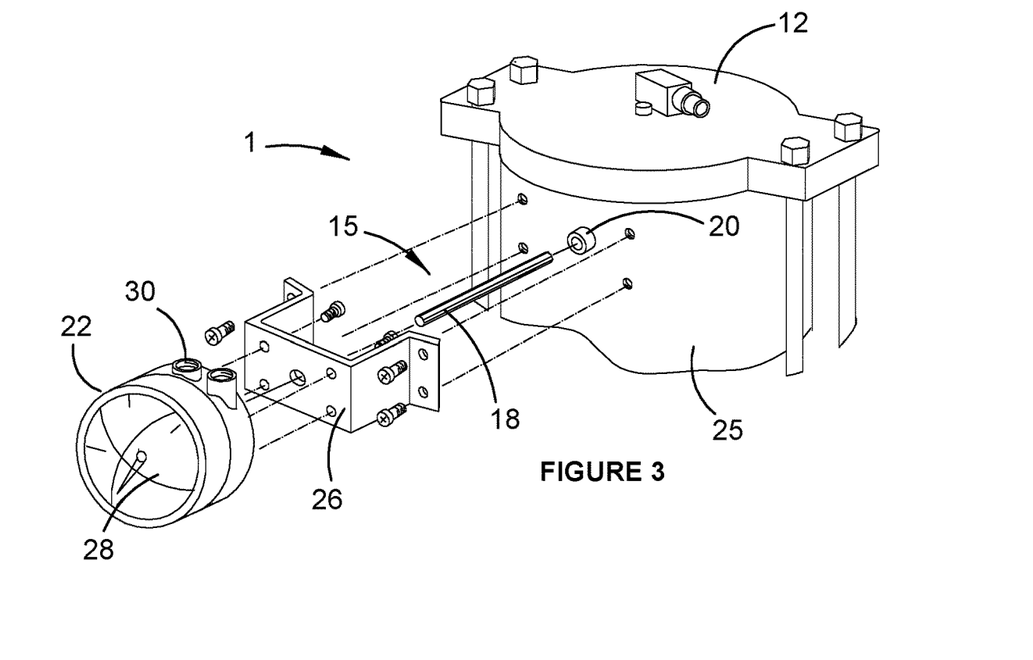
FIG. 3 is an enlarged exploded perspective view of the actuator of FIGS. 1 and 2, showing the rotary output mechanism and an associated positioning instrument in more detail.

Referring initially to FIGS. 1 to 3, the invention in a first aspect provides a linear actuator (1) including a cylinder (2) defining a cylinder axis (3), and a piston (4) movable slidably within the cylinder (2) along the cylinder axis. A piston rod (10) extends axially from the piston for connection via a rod end fitting to an external mechanism such as a valve assembly (not shown). In use, movement of the piston thereby actuates or controls the external valve or other mechanism to which the actuator is operatively connected. In the embodiment illustrated, the actuator is an hydraulic or pneumatic actuator, adapted to receive fluid pressure from an hydraulic or pneumatic circuit, via a fluid inlet-outlet port (12). However, it should be understood that the invention may be adapted for use with other forms of linear actuator including electrical, electro-magnetic, electro-mechanical and mechanical actuators. Moreover, the invention may be adapted for use with single or double-acting hydraulic or pneumatic actuators.

A rotary output mechanism (15) includes a rotary output element, preferably in the form of an output drive spindle (18), extending generally transversely or radially from the cylinder (2), through a hub or boss (20), for rotation about a rotary output axis generally normal to the cylinder axis. The rotary output mechanism (15) is responsive to movement of the piston by various means described in more detail below, and the rotary output drive spindle (18) is adapted for operative engagement with an instrument (22) mounted either directly or indirectly to the cylinder. In this way, axial movement of the piston (4) effects a corresponding rotational displacement of the drive spindle (18), whereby the instrument provides an output signal indicative of the position of the piston within the cylinder.

In some preferred embodiments, the instrument is a positioner or position indicator, and preferably incorporates a rotary input element adapted for operative engagement with the drive spindle of the rotary output mechanism. As best seen in FIG. 3, the instrument in some embodiments is adapted for mounting on a sidewall (25) of the cylinder by means of a mounting bracket assembly (26).

In preferred embodiments, the actuator and associated rotary output mechanism are adapted for use with "Namur" type instruments, and are configured in accordance with Namur standards. The particular instrument shown includes a sight gauge (28) adapted to display, by means of a rotary dial or other suitable form of indicia or display, a visual indication of the position of the piston within the cylinder of the actuator. In the embodiment shown, the instrument is also adapted to generate electrical control signals, preferably Namur compatible control signals, for use as part of a control system to monitor or regulate the positioning of the actuator. To this end, the instrument includes screw-threaded connecting ports (30), adapted to receive complementary Namur sensors or probes, of the type that will be familiar to those skilled in the art.

Advantageously, the operational range of rotational displacement of the rotary output element, such as the drive spindle (18), is calibrated to match the operational range of rotational displacement of the instrument, via the associated rotary input element of that instrument. This may be achieved, for example, by means of the inherent design of the rotary output mechanism to produce the desired range of rotational displacement, or alternatively by means of a supplementary gearbox, intermediate conversion module, or similar mechanism. In some preferred embodiments, the operational range is approximately 90°, for direct compatibility with conventional Namur type instruments. In other embodiments, the operational range is around 55°, for compatibility with other standard forms of instrumentation, including some Namur instruments.

In applications of the invention where the actuator is connected to a valve assembly, the rotary output mechanism (15) is ideally calibrated such that the operational range of rotational displacement of the drive spindle (18), and the operational range of rotational displacement of the associated rotary input element of the monitoring or positioning instrument (22), correspond to the full operational range of movement of the flow control element within the valve, between the fully opened and fully closed positions. In this way, it will be appreciated that the instrument provides an output signal (visual and/or electrical for monitoring or control) that is directly indicative of the operational position of the valve itself.

Figure 4:
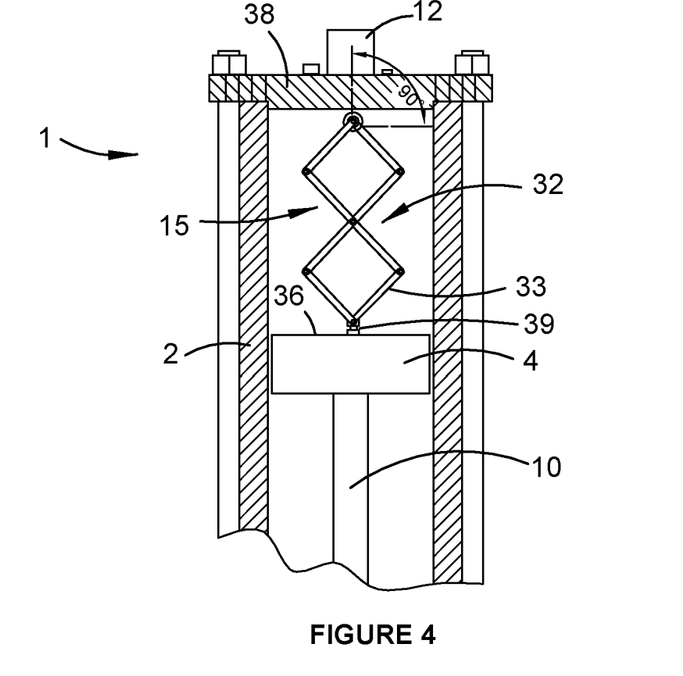
FIG. 4 is a cutaway front elevation view of a rotary output mechanism connected to the piston within the cylinder of the actuator, according to a first embodiment of the invention.
Figure 5:
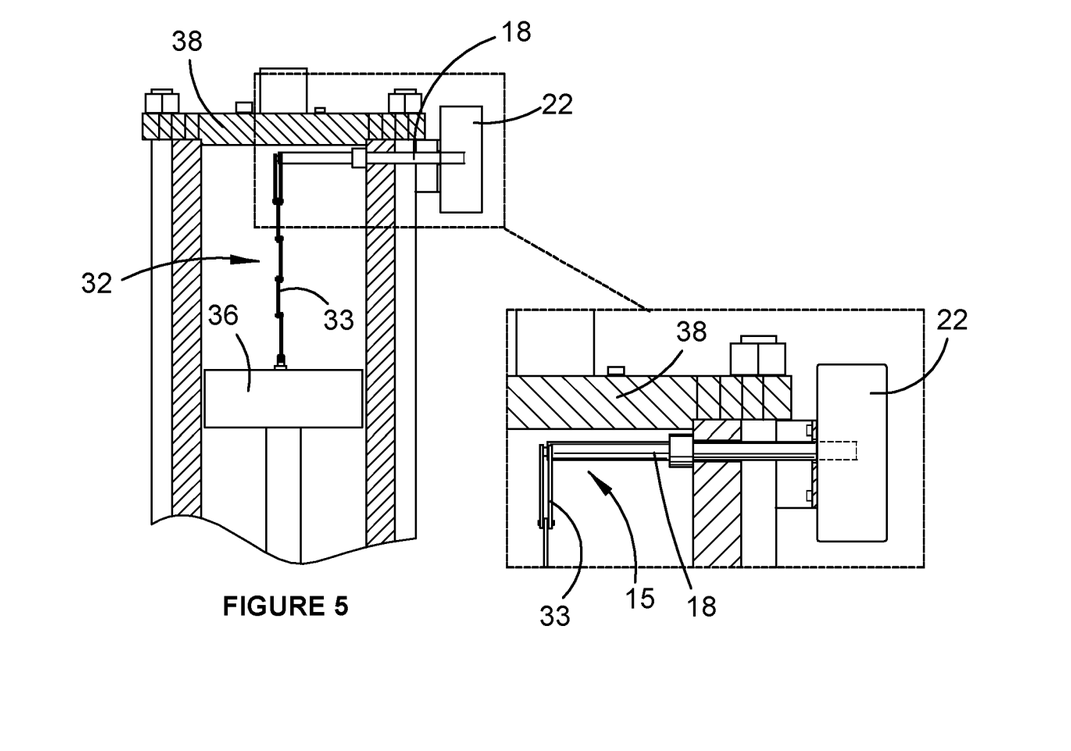
FIG. 5 is a cutaway side elevation view of the actuator of FIG. 4, showing the rotary output mechanism in more detail.

Referring now to FIG. 4, wherein similar features are denoted by corresponding reference numerals, in a first embodiment the rotary output mechanism (15) includes a scissor or pantograph type linkage mechanism (32), comprising a plurality of elongate linkage elements (33), pivotally interconnected in a criss-cross or "X" configuration within the cylinder, with a pivot axis at each end. More specifically, the movable end of the linkage mechanism is connected to the piston crown (36) and the opposite fixed end of the linkage mechanism is supported adjacent to an inner surface of the cylinder head (38). One of the linkage elements (33) at the upper fixed end is operatively connected to the drive spindle (18), with the pivot axis of the linkage mechanism at the fixed end being coaxial with the drive spindle. By this means, axial displacement of the piston within the cylinder effects a corresponding rotational displacement of the drive spindle, which in turn is connected to the instrument (22),—typically a positioner or position indicator.

In this embodiment, the linkage mechanism would normally require the piston to be constrained to prevent relative rotational displacement within the cylinder. To provide this constraint, an anti-rotation mechanism could be incorporated, such as a key way extending axially along the inner wall of the cylinder and a complementary key protruding radially outwardly from the piston for sliding engagement with the key way. In other forms, the piston and cylinder may have corresponding non-circular cross-sectional profiles, thereby to permit relative axial displacement while preventing relative rotation between the piston and the cylinder.

However, such anti-rotation mechanisms in whatever form usually add complexity and expense. To avoid the need for this, a swivel assembly (39) is interposed between the linkage mechanism (32) and the piston crown (36). The swivel assembly enables relative rotational displacement between the linkage mechanism and the piston, thereby obviating the need to prevent relative rotation between the piston and the cylinder.

Figure 6:
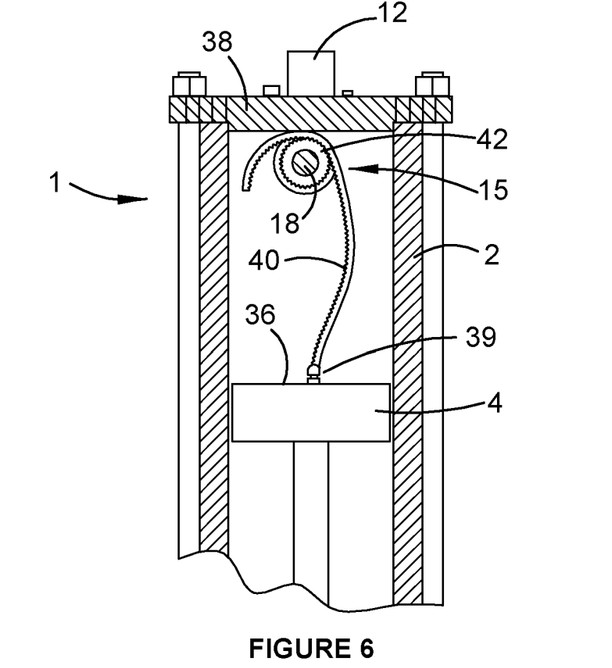
FIG. 6 is a cutaway front elevation view showing an actuator incorporating a rotary output mechanism in accordance with a second embodiment of the invention.
Figure 7:
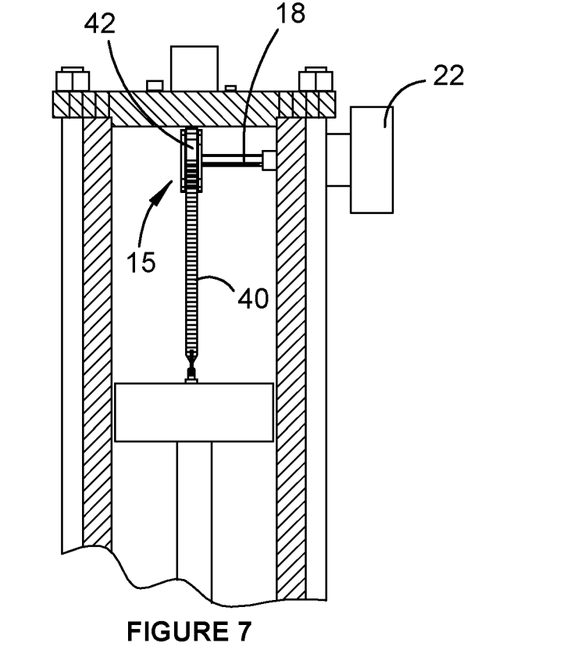
FIG. 7 is a cutaway side elevation view of the actuator of FIG. 6.

FIGS. 6 and 7 show a further embodiment, in which the rotary output mechanism (15) includes a relatively stiff toothed drive belt (40) engageable with a complementary pinion gear (42). The drive belt (40) is connected at one end to the piston crown (36) while the pinion gear (42) is rotatably supported adjacent the cylinder head (38), within the cylinder. The pinion gear (42) is connected coaxially with the rotary output element or drive spindle (18) and if necessary guide means are used in order to retain the drive belt in operative engagement with the pinion. In this way, axial displacement of the piston within the cylinder effects a corresponding displacement of the drive belt (40), which in turn causes rotation of the pinion, to effect a corresponding rotational displacement of the output drive spindle (18). In the embodiment shown, the guide means effectively take the form of an adjacent inner surface of the cylinder head. In other embodiments, however, supplementary guide tracks, guide surfaces, guide channels or guide wheels may be used to support and accurately position the drive belt within the cylinder. It will be understood that the drive belt in this configuration needs to be sufficiently stiff to transmit drive to the pinion substantially in proportion to piston displacement, while being sufficiently flexible to enable the free end to be coiled and contained within the cylinder throughout the normal range of operational movement. Once again in this embodiment, a swivel mechanism (39) interposed between the drive belt and the piston enables relative rotational displacement between the rotary output mechanism and the piston, thereby obviating the need to prevent relative rotation between the piston and the cylinder.

Figure 8:
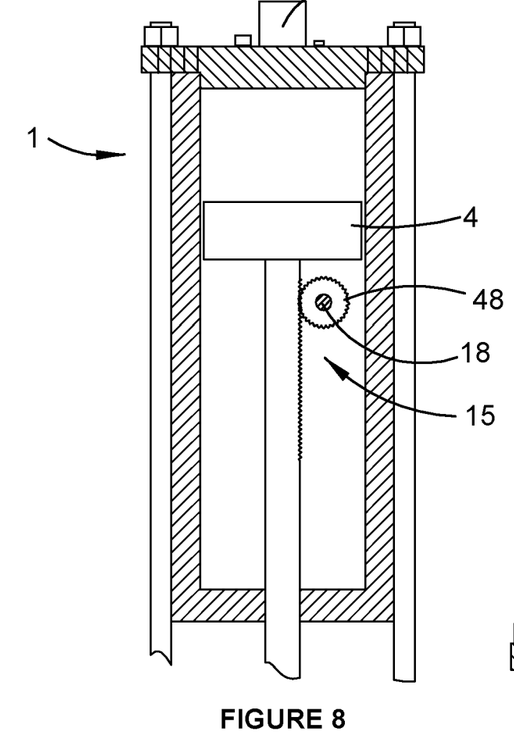
FIG. 8 is a cutaway front elevation view of an actuator incorporating a rotary output mechanism according to a third embodiment of the invention.
Figure 9:
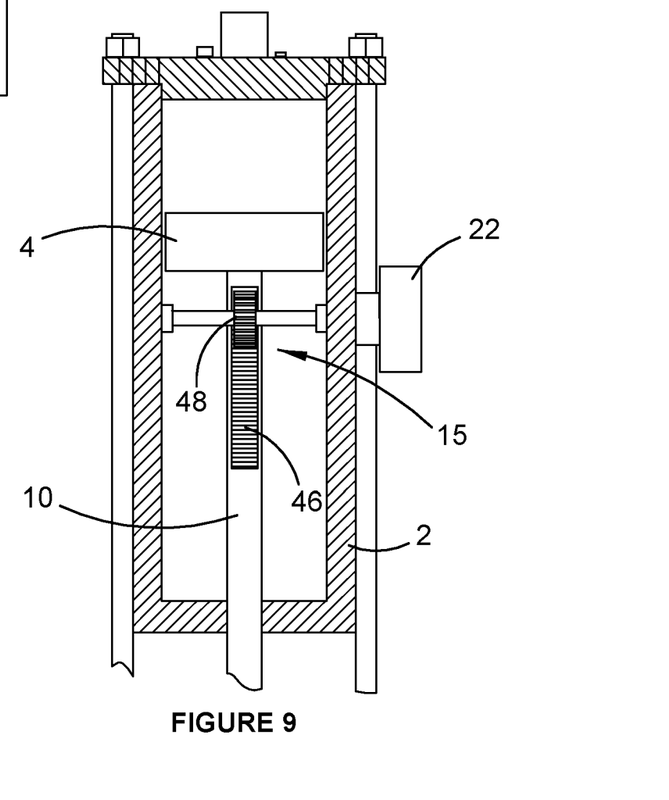
FIG. 9 is a cutaway side elevation view of the actuator shown in FIG. 8.

A further embodiment is shown in FIGS. 8 and 9, wherein again similar features are denoted by corresponding reference numerals. In this case, the rotary output mechanism (15) includes tooth formations (46) formed directly on the piston rod (10), or a toothed rack attached to the piston rod, below the piston crown. The teeth (46) on the piston rod are engageable with a complementary pinion gear (48) housed within the cylinder. The pinion gear (48) is connected to the rotary output drive spindle (18), whereby axial displacement of the piston effects a corresponding rotational displacement of the drive spindle, for interaction with the instrument (22) connected thereto.

Figure 10:
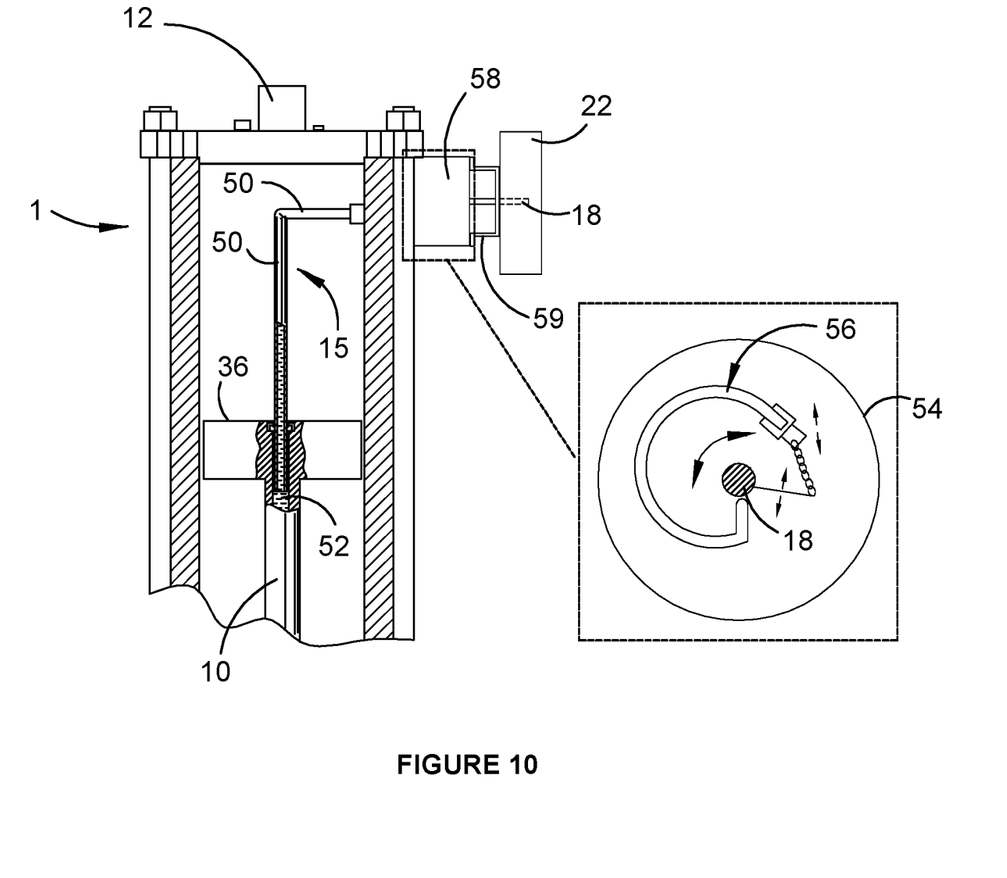
FIG. 10 is a cutaway side elevation view of an actuator incorporating a rotary output mechanism according to a fourth embodiment of the invention.

In a further embodiment, as shown in FIG. 10, the rotary output mechanism (15) includes a pressure tube (50) axially oriented in the cylinder and extending slidably through the piston crown (36) into a pressure chamber (52) defined within the piston rod (10). The upper end of the pressure tube (50) extends radially outwardly through the cylinder to a conversion mechanism (54) adapted to induce rotary motion of the output drive spindle (18), in response to changes in pressure within the pressure tube. In one preferred embodiment, the conversion mechanism (54) includes a Bourdon tube apparatus (56), as best seen in the enlarged detail of FIG. 10. The conversion mechanism is disposed within a housing (58), adapted for mounting to the outer side wall of the cylinder. The positioner or other instrument (22) is operatively connected to the housing (58) for engagement with the drive spindle, by means of an intermediate mounting bracket assembly (59). In this way, axial displacement of the piston induces a corresponding change in pressure within the pressure tube, in turn to effect a corresponding rotational displacement of the output drive spindle (18), thereby to provide a rotary control input to the instrument. Advantageously, this embodiment is inherently able to accommodate rotational displacement of the piston within the cylinder, without affecting the operation of the rotary output mechanism.

Figure 11:
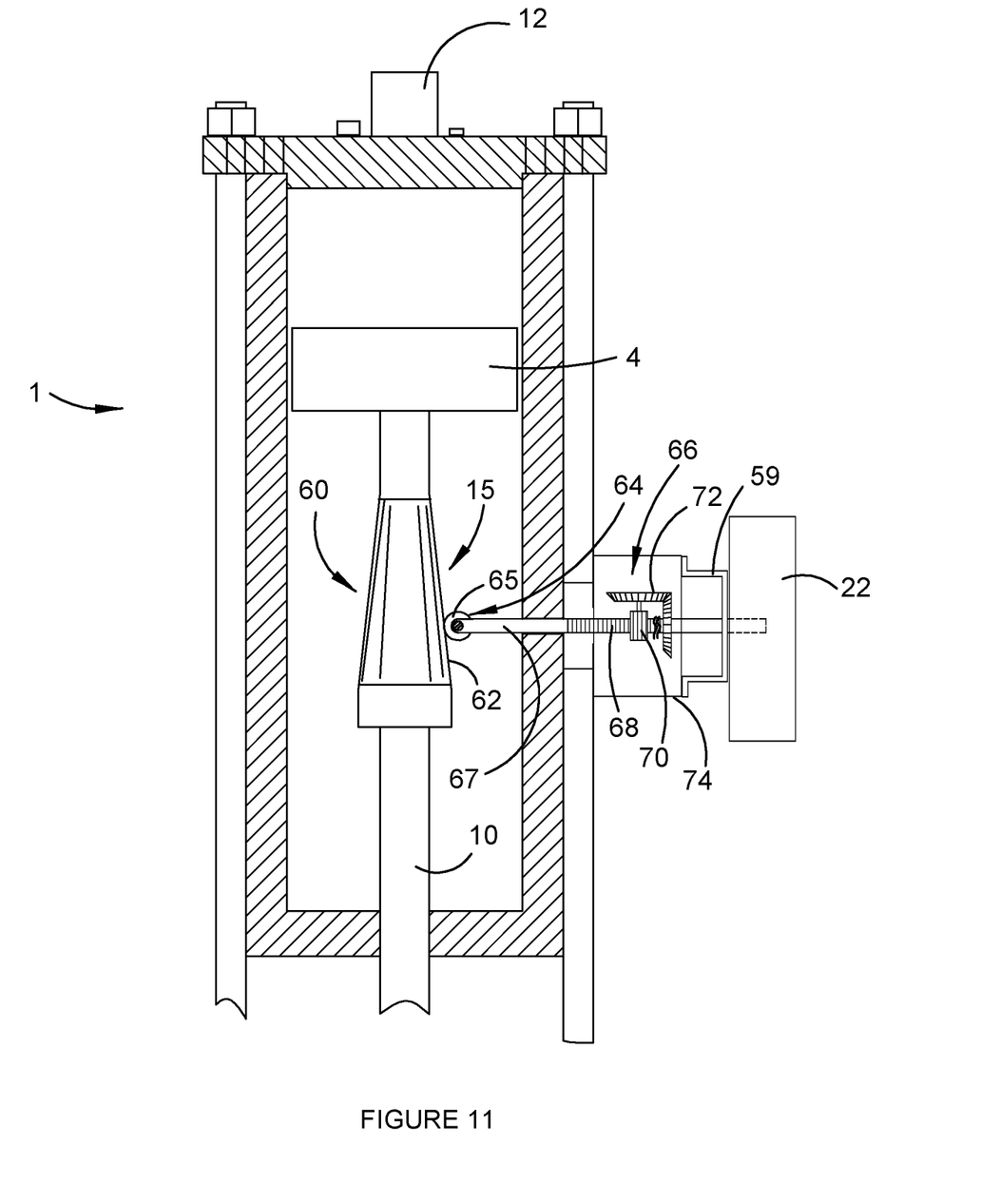
FIG. 11 is a cutaway side elevation view of an actuator incorporating a rotary output mechanism according to a fifth embodiment of the invention.

A further embodiment of the invention is shown in FIG. 11. In this case, the rotary output mechanism (15) includes a frusto-conical formation (60) on the piston rod (10) defining a ramp surface (62) inclined with respect to the cylinder axis. A ramp engagement assembly (64) incorporating a roller (65) on the remote end, is supported for rolling engagement with the ramp surface (62), whereby axial displacement of the piston induces a corresponding lateral or radial displacement of the ramp engagement assembly (64). In this embodiment, the rotary output mechanism (15) further includes a conversion mechanism (66) whereby the lateral displacement of the ramp engagement assembly (64) is translated into a corresponding rotational movement of the output drive spindle (18). This embodiment is also inherently able to accommodate rotational displacement of the piston within the cylinder, without affecting the operation of the rotary output mechanism.

More particularly, in this embodiment, the ramp engagement assembly includes an actuating rod (67) extending transversely or radially outwardly through the cylinder wall. The remote end of the actuating rod includes tooth formations (68) adapted for engagement with a pinion gear (70). The pinion gear (70) is connected to a first bevel gear (72), which engages a second bevel gear (73) oriented at 90° to the first bevel gear. The second bevel gear (73) in turn is connected to the output drive spindle (18). This gear train is supported within a housing (74) mounted to the side wall of the cylinder, with the drive spindle (18) extending outwardly therefrom. The instrument (22) is mounted for operative engagement with the conversion mechanism (66) by means of an intermediate bracket assembly (59) attached to the housing (74) such that axial displacement of the piston effects a corresponding rotational displacement of the output drive spindle, thereby providing a corresponding rotary input to the instrument.

Figure 12:
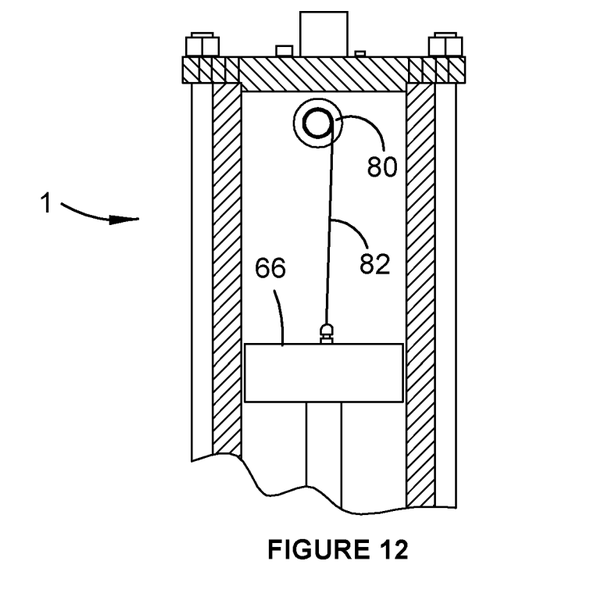
FIG. 12 is a cutaway front elevation view of an actuator incorporating a rotary output mechanism according to a sixth embodiment of the invention.
Figure 13:
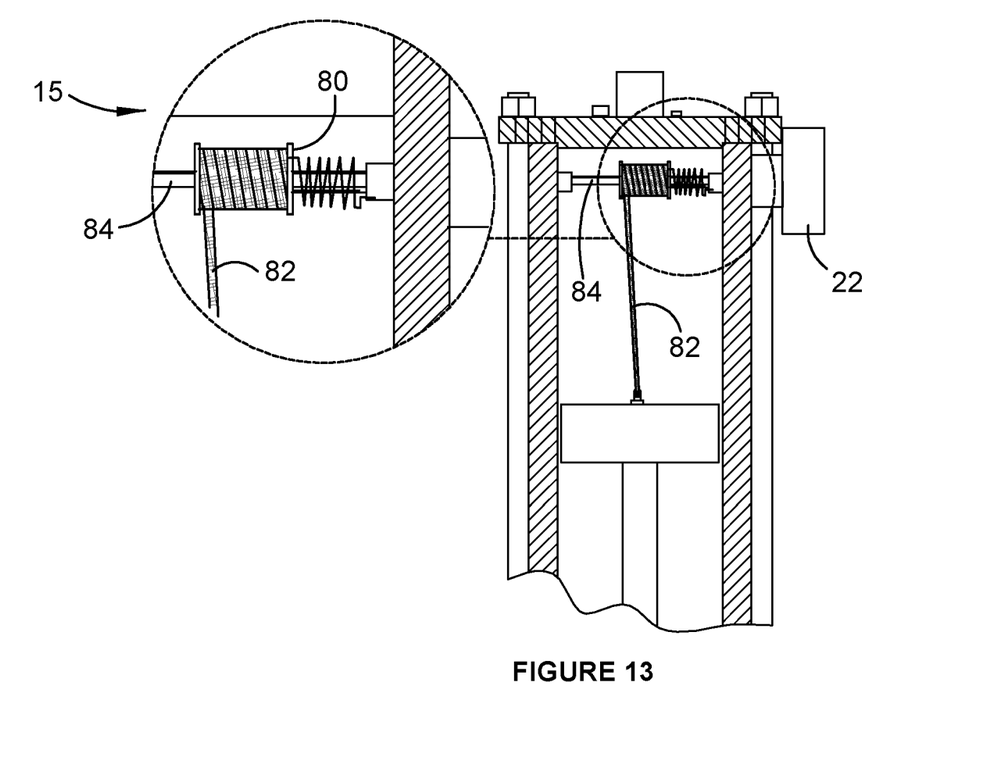
FIG. 13 is a cutaway side elevation view of the actuator shown in FIG. 12.

Another embodiment of the invention is shown in FIGS. 12 and 13, wherein once again similar features are denoted by corresponding reference numerals. In this embodiment, the rotary output mechanism (15) includes a spring-loaded drive spool (80) supported within the cylinder for rotation about a transverse axis. A flexible cable or cord (82) extends from the piston crown (66) to the drive spool. The spring mechanism winds the cable progressively onto the spool as the piston rises, and allows the cable to unwind as the piston falls, while maintaining tension in the cable throughout the piston stroke. The drive spool is coupled to a drive axle (84), which in turn is connected directly to the output drive spindle (18). By this means, axial displacement of the piston causes rotational displacement of the drive spool and drive axle, to effect rotation of the output drive spindle, thereby providing a corresponding rotary input to the positioner or other instrument (22).

In each of these illustrative examples, it will be appreciated that the instrument connected to the rotary output mechanism, whether a sensor, indicator, positioner or other form of instrument, is able to be mounted directly or indirectly to the side of the actuator. This makes the instrument readily visible for inspection, and readily accessible for replacement, maintenance or repair, from a position immediately alongside the actuator. This is a significant advantage in larger scale installations involving large capacity actuators, which are typically located behind guard rails or screens for safety reasons, with the cylinder heads typically elevated. In such installations, the top of the actuator is particularly less visible and less accessible for maintenance, inspection or monitoring, so any top-mounted or upwardly oriented instruments are especially difficult to access and read. In some configurations, this can constitute a safety hazard for system operators and monitoring or maintenance personnel.

Moreover, the rotary output mechanism that renders the system compatible with conventional Namur and similar instrumentation designed for rotary inputs, is not normally feasible or readily adaptable for use (without significant complexity or expense) with linear actuators.

It should be also understood that advantageously, the rotary output mechanism may be either manufactured integrally with the actuator or adapted for retrofitting to existing actuators, subject to basic design and configuration constraints. Furthermore, the rotary output mechanism in various preferred embodiments is either inherently unaffected by rotational displacement of the actuator piston within the cylinder, or can be readily isolated from such displacement, thereby obviating the need for potentially complex and expensive anti-rotation mechanisms. This is significant, as a number of valve designs do not inherently constrain the piston rod to prevent relative rotation of the piston in normal usage. In these and other respects, it will be appreciated that the invention represents a practical and commercially significant improvement over the prior art.

Although the invention has been described with reference to specific examples, it will be understood by those skilled in the art that the invention may be embodied in many other forms.

The invention claimed is:
1. A linear actuator including:
a cylinder defining a cylinder axis;
a piston movable within the cylinder along the cylinder axis;
a piston rod extending axially from the piston for connection to a mechanism whereby in use, movement of the piston actuates the mechanism;
a rotary output mechanism including a rotary output element extending generally transversely from the cylinder and supported for rotation about an output axis generally normal to the cylinder axis;

the rotary output mechanism being responsive to movement of the piston, and the rotary output element being adapted for operative engagement with an instrument mounted to the cylinder;

wherein the rotary output mechanism includes a scissor linkage mechanism, including a plurality of elongate linkage elements pivotably interconnected in a criss-cross configuration within the cylinder, with a pivot axis at each end, such that axial movement of the piston effects a corresponding rotational displacement of the rotary output element, whereby in use the instrument provides an output signal indicative of the position of the piston within the cylinder, and wherein a swivel assembly is interposed between the scissor linkage mechanism and the piston, the swivel assembly enabling relative rotational displacement between the scissor linkage mechanism and the piston around the cylinder axis.

2. A linear actuator according to claim 1, wherein an operational range of rotational displacement of the rotary output element is around 90°.

3. A linear actuator according to claim 1, wherein a movable end of the linkage mechanism is connected to a crown of the piston and an opposite fixed end of the linkage mechanism is supported adjacent a head of the cylinder, within the cylinder.

4. A linear actuator according to claim 1, wherein one of the linkage elements at the fixed end is operatively connected to the rotary output element with the pivot axis of the linkage mechanism at the fixed end being coaxial with the rotary output element, whereby axial displacement of the piston effects a corresponding rotational displacement of the rotary output element.

5. A linear actuator according to claim 1, wherein the instrument is adapted for mounting on a side wall of the cylinder by means of an intermediate mounting bracket assembly.

6. A rotary output mechanism, adapted for connection to a linear actuator in accordance with claim 1, such that axial movement of the piston within the cylinder of the actuator effects a corresponding rotational displacement of the rotary output element of the output mechanism, whereby in use a rotary instrument mounted to the cylinder or to the rotary output mechanism provides an output signal indicative of the position of the piston within the cylinder.

* * * * *